US009191837B2

(12) United States Patent
Roy et al.

(10) Patent No.: US 9,191,837 B2
(45) Date of Patent: *Nov. 17, 2015

(54) NEIGHBOR SCANNING IN WIRELESS LOCAL AREA NETWORKS

(71) Applicant: InterDigital Technology Corporation, Wilmington (DE)

(72) Inventors: Vincent Roy, Longueuil (CA); Paul Marinier, Brossard (CA); Marian Rudolf, Montreal (CA); Frank La Sita, Setauket, NY (US); Christopher Cave, Dollard-des-Ormeaux (CA); Athmane Touag, Chomedey Laval (CA); Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.
This patent is subject to a terminal disclaimer.

(21) Appl. No.: 14/223,069

(22) Filed: Mar. 24, 2014

(65) Prior Publication Data
US 2014/0204933 A1   Jul. 24, 2014

Related U.S. Application Data

(63) Continuation of application No. 13/335,375, filed on Dec. 22, 2011, now Pat. No. 8,682,368, which is a continuation of application No. 11/168,707, filed on Jun. 28, 2005, now Pat. No. 8,099,094.

(60) Provisional application No. 60/587,159, filed on Jul. 12, 2004.

(51) Int. Cl.
*H04W 36/00* (2009.01)
*H04W 24/02* (2009.01)
(Continued)

(52) U.S. Cl.
CPC .............. *H04W 24/02* (2013.01); *H04W 24/00* (2013.01); *H04W 36/0055* (2013.01);
(Continued)

(58) Field of Classification Search
CPC ..... H04W 64/00; H04W 48/16; H04W 48/20; H04W 84/12; H04W 88/08; H04W 48/08; H04W 52/0216; H04W 52/0219; H04W 68/00; H04W 76/04; H04W 80/04; H04W 28/04; H04W 56/009; H04W 80/00
USPC ................... 455/434, 509, 432.1, 456.1, 436; 370/350, 509
See application file for complete search history.

(56) References Cited
U.S. PATENT DOCUMENTS 5,530,915 A   6/1996   Shaughnessy et al.
5,923,702 A   7/1999   Brenner et al.
(Continued)

FOREIGN PATENT DOCUMENTS

EP   0 886 453        12/1998
EP   1313332 A1      5/2003
(Continued)

OTHER PUBLICATIONS

Institute of Electrical and Electronics Engineers (IEEE) 802 Committee of the IEEE Computer Society, *Draft Supplement to Standard for Telecommunications and Information Technology Between Systems—LAN/MAN Specific Requirements—Part 11: Wireless Medium Access Control (MAC) and Physical Layer (PHY) Specifications*: IEEE Standard 802.11k/D0.15, Jun. 2004.
(Continued)

*Primary Examiner* — Inder Mehra
(74) *Attorney, Agent, or Firm* — Volpe and Koenig, P.C.

(57) ABSTRACT

An access point in a wireless local area network may receive an information request from a station associated with the access point. The information request is requesting information about a second beacon transmission associated with a service set identifier (SSID) different from an SSID of the access point. The access point includes a timing information device configured to generate an information response for a beacon signal associated with the SSID different from the SSID of the access point. The information response may include a time difference, relative to a beacon signal sent by the access point, for transmission of the beacon signal associated with the SSID different from the SSID of the access point. The time difference may be an offset in timing units. The access point also includes a transmitter configured to transmit the information response to the station in response to receiving the information request.

16 Claims, 3 Drawing Sheets

(51) Int. Cl.
*H04W 24/00* (2009.01)
*H04W 8/00* (2009.01)
*H04W 48/12* (2009.01)
*H04W 56/00* (2009.01)
*H04W 84/12* (2009.01)
*H04W 92/20* (2009.01)
*H04W 52/02* (2009.01)

(52) U.S. Cl.
CPC .............. *H04W 8/005* (2013.01); *H04W 48/12* (2013.01); *H04W 52/0216* (2013.01); *H04W 56/00* (2013.01); *H04W 84/12* (2013.01); *H04W 92/20* (2013.01)

(56) References Cited

U.S. PATENT DOCUMENTS

| | | | |
|---|---|---|---|
| 5,940,765 A | 8/1999 | Haartsen | |
| 5,970,414 A | 10/1999 | Bi et al. | |
| 6,112,058 A | 8/2000 | Walters et al. | |
| 6,201,966 B1 | 3/2001 | Rinne et al. | |
| 6,345,043 B1 | 2/2002 | Hsu | |
| 6,522,670 B1 | 2/2003 | Jokinen et al. | |
| 6,526,039 B1 | 2/2003 | Dahlman et al. | |
| 6,728,540 B1 | 4/2004 | DeSantis et al. | |
| 6,990,428 B1 | 1/2006 | Kaiser et al. | |
| 7,085,564 B2 | 8/2006 | Nishiyama et al. | |
| 8,099,094 B2* | 1/2012 | Marinier et al. | 455/432.1 |
| 8,682,368 B2* | 3/2014 | Marinier et al. | 455/502 |
| 2002/0025810 A1 | 2/2002 | Takayama et al. | |
| 2002/0123345 A1 | 9/2002 | Mahany et al. | |
| 2003/0003912 A1 | 1/2003 | Melpignano et al. | |
| 2003/0039273 A1 | 2/2003 | Jang | |
| 2003/0073409 A1 | 4/2003 | Nobukiyo et al. | |
| 2003/0095516 A1 | 5/2003 | Ok et al. | |
| 2003/0119484 A1 | 6/2003 | Adachi et al. | |
| 2003/0133457 A1 | 7/2003 | Ono et al. | |
| 2003/0145092 A1 | 7/2003 | Funato et al. | |
| 2003/0207697 A1 | 11/2003 | Shpak | |
| 2003/0217168 A1* | 11/2003 | Adachi et al. | 709/229 |
| 2003/0219005 A1 | 11/2003 | Isnard et al. | |
| 2004/0008661 A1 | 1/2004 | Myles et al. | |
| 2004/0028001 A1 | 2/2004 | Billhartz | |
| 2004/0043767 A1 | 3/2004 | Tsutsumi et al. | |
| 2004/0063426 A1 | 4/2004 | Hunkeler | |
| 2004/0100929 A1 | 5/2004 | Garcia-Luna-Aceves | |
| 2004/0100957 A1 | 5/2004 | Huang et al. | |
| 2004/0120292 A1 | 6/2004 | Trainin | |
| 2004/0141490 A1 | 7/2004 | Hong | |
| 2004/0190467 A1 | 9/2004 | Liu et al. | |
| 2004/0224690 A1 | 11/2004 | Choi et al. | |
| 2005/0068928 A1 | 3/2005 | Smith et al. | |
| 2005/0169233 A1 | 8/2005 | Kandala et al. | |
| 2005/0190731 A1 | 9/2005 | Bejerano et al. | |
| 2005/0232200 A1 | 10/2005 | Jeong et al. | |
| 2005/0243794 A1 | 11/2005 | Yoon et al. | |
| 2005/0265288 A1 | 12/2005 | Liu et al. | |
| 2006/0023661 A1 | 2/2006 | Bennett | |
| 2006/0075131 A1 | 4/2006 | Douglas et al. | |
| 2006/0153133 A1 | 7/2006 | Zhong | |
| 2006/0155860 A1 | 7/2006 | Funato et al. | |
| 2006/0234740 A1 | 10/2006 | Sakoda | |
| 2013/0143555 A1* | 6/2013 | Singh et al. | 455/434 |

FOREIGN PATENT DOCUMENTS

| | | |
|---|---|---|
| JP | 2002-215410 | 8/2002 |
| JP | 2003-060657 | 2/2003 |
| JP | 2004-178290 | 6/2004 |
| WO | 01/20940 | 3/2001 |
| WO | 2003/077482 A1 | 9/2003 |
| WO | 2004/054283 | 6/2004 |

OTHER PUBLICATIONS

Institute of Electrical and Electronics Engineers (IEEE) 802 Committee of the IEEE Computer Society, *Draft Amendment to Standard for Information Technology- Telecommunications and Information Exchange Between Systems—LAN/MAN Specific Requirements—Part 11: Wireless Medium Access Control (MAC) and Physical Layer (PHY) Specifications, Amendment 7: Radio Resource Measurement*: IEEE Standard 802.11k/D2.0, Feb. 2005.

LAN MAN Standards Committee of the IEEE Computer Society, "Information technology-Telecommunications and information exchange between systems-Local and metropolitan area networks-Specific requirements- Part 11: Wireless LAN Medium Access Control (MAC) and Physical Layer (PHY) Specifications," ANSI IEEE Std 802.11, pp. 1-137 1999 Edition (R2003).

Mouly et al., The Pseudo-Synchronisation, a Costless Feature to Obtain the Gains of Synchronised Cellular Network, Nov. 1991, MRXC Mobile Radio Conference.

Zheng et al., "Asynchrony Wakeup for Ad Hoc Networks," ACM International Symposium on Mobile Ad Hoc Networking and Computing, pp. 33-45 (Jun. 2003).

Engwer, "Measurement of 802.11 Roaming Intervals," IEEE 802.11-04/0086r3 (May 11, 2004).

Rudolf et al., "802.11 Discovery Phase and Passive Scanning Mode," IEEE 802.11-04/0718r0 (Jul. 15, 2004).

Wright, "A Technique for Fast Passive Scanning," IEEE 802.11-03/0768r0 (Sep. 18, 2003).

* cited by examiner

NEIGHBOR SCANNING IN WIRELESS LOCAL AREA NETWORKS

CROSS REFERENCE TO RELATED APPLICATIONS

This application is a continuation of U.S. patent application Ser. No. 13/335,375, filed Dec. 22, 2011, now U.S. Pat. No. 8,682,368, issued Mar. 25, 2014, which is a continuation of U.S. patent application Ser. No. 11/168,707, filed Jun. 28, 2005, now U.S. Pat. No. 8,099,094, issued Jan. 17, 2012, which claims the benefit of U.S. Provisional Patent Application No. 60/587,159, filed Jul. 12, 2004, which are incorporated by reference as if fully set forth herein.

FIELD OF INVENTION

The present invention generally relates to wireless local area networks (WLANs), and more particularly, to methods for scanning for neighboring access points (APs).

BACKGROUND

WLANs have become more popular because of their convenience and flexibility. As new applications for such networks are developed, their popularity is expected to significantly increase. One of the promising areas is the use of Voice over Internet Protocol (VoIP) and an increasing demand for support of seamless service continuity (i.e., handover) in contiguous WLAN deployment areas when the user is mobile.

In the IEEE 802.11 standards, the stations (STAs) can use two different modes to identify APs: active scanning mode and passive scanning mode. Whether a STA uses active or passive scanning mode is usually determined by configurable settings; in practice both modes are used. In the active scanning mode, the STA chooses a frequency channel and transmits a Probe Request frame, then waits for a certain amount of time to receive a reply in the form of a Probe Response frame. The Probe Response frame is typically sent by the AP when the basic service set (BSS) operates in infrastructure mode. In case the STA does not receive a Probe Response frame after a certain amount of time, it tunes to a new frequency and repeats the process.

In passive scanning mode, the STA tries to find out about the presence of a BSS on a particular frequency channel by tuning to the frequency and listening for a certain amount of time in order to capture the beacon frames broadcast in regular time intervals by the AP. In case the STA does not receive a beacon frame after a certain amount of time, it tunes to a new frequency and repeats the process.

When using passive scanning mode, a STA may know on which frequency channels it is likely to find candidate APs, but it does not know exactly when a beacon frame will be sent by a neighboring AP. Typically, beacon frames are sent in predetermined fixed time intervals, e.g., every 100 ms. In the worst case, a STA tunes to the target frequency and must wait for at least 100 ms until a beacon frame occurs. In the case where a STA has only one receiver, its ongoing service on the old frequency is interrupted while the STA performs passive scanning on the target frequency.

Executing an efficient handover in a WLAN implies several requirements, such as: identification and measurements of suitable candidate APs for handover, establishment of a STA's authentication and security context in the target AP, re-association with the target AP, and transferring the data link to the target AP.

WLANs have traditionally not been developed with the goal in mind to provide full seamless mobility support. One of the problems with the current WLAN systems is that the identification and measurement of suitable candidate APs by the STA is a lengthy process, and could last for several hundred milliseconds. Moreover, STA behavior is not well-specified and the duration of the measurement process can vary largely with different implementations chosen by the manufacturers.

In order to avoid noticeable service interruption by the user, for example, during a VoIP call, the handover process needs to be executed quickly (the service interruption time should typically not exceed several tens to a few hundred milliseconds). In addition, the process of STA measuring and identifying neighbor candidate APs should not impact the performance of the ongoing service in any noticeable manner.

Therefore, there is a need to improve the efficiency of the passive scanning mode to enable use of the passive scanning mode while guaranteeing service continuity and seamless handover, especially for VoIP.

SUMMARY

The present invention includes methods, signaling mechanisms, and timing information regarding transmission intervals and schedules of neighbor candidate APs. The AP sends timing information about the neighbor candidate APs to the STA, then the STA can use the timing information to schedule its tuning to the target frequency and execute identification and measurement of the target AP in a minimum amount of time.

Timing information on neighbor candidate APs can be sent to STAs using broadcast/multicast-type frames (for example included in a beacon frame) or unicast type Medium Access Control (MAC) frames. Furthermore, information elements (IE) containing timing information can be sent in MAC management frames or can be piggybacked onto MAC control or data frames.

An access point includes a transmitter configured to transmit signals, a receiver configured to receive signals, and a timing information device. The timing information device is configured to receive a timing information request from a station associated to the access point, receive timing information for a beacon signal sent by a second access point, and report the timing information to the station. The timing information includes a time difference relative to a known reference time for transmission of the beacon signal and the time difference is an offset in timing units.

An access point includes a beacon transmission device and a timing information device. The beacon transmission device is configured to transmit a beacon signal and generate timing information about the beacon signal. The timing information includes a time difference relative to a known reference time for transmission of the beacon signal, and the time difference is an offset in timing units. The timing information device is configured to receive the timing information from the beacon transmission device and report the timing information to another access point.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the term "station" (STA) includes, but is not limited to, a wireless transmit/receive unit, a user equipment, a mobile station, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention includes methods where timing information regarding transmission intervals of neighbor candidate APs, typically beacon frame transmit times, are sent to a STA to improve the efficiency of the passive scanning mode.

The AP sends timing information about the neighbor candidate APs to the STA. The STA then can use the timing information to schedule its tuning to the target frequency and execute identification and measurement of the target AP in a minimum amount of time.

Figure 1:
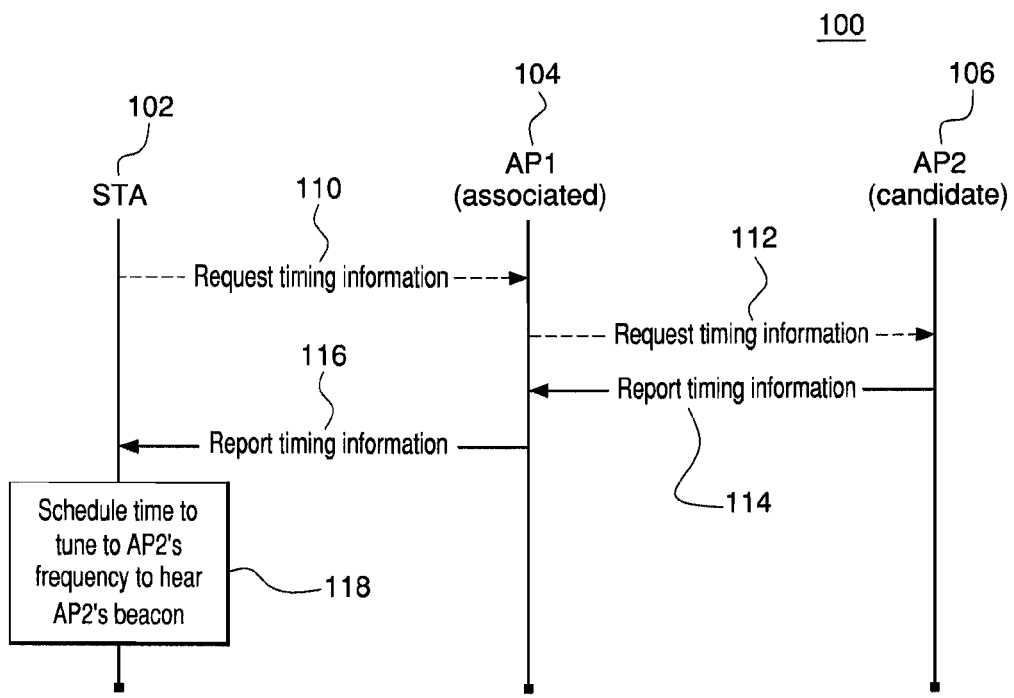
FIG. 1 is a flow diagram of a method for communicating timing information between a STA, an AP associated to the STA, and a candidate AP.

FIG. 1 is a flow diagram of a method 100 for communicating timing information between a STA 102, an AP (AP1) 104 to which the STA 102 is associated, and a candidate AP (AP2) 106. As optional first steps, the STA 102 requests timing information for the candidate AP2 106 from AP1 104 (step 110), which then requests timing information from AP2 106 (step 112). AP2 106 reports its timing information to AP1 (step 114). This step is required only if AP1 has not already obtained AP2's timing information beforehand; there are additional means for AP1 to obtain the timing information (discussed below). AP1 reports the timing information for AP2 to the STA 102 (step 116). The STA 102 then schedules time to tune to AP2's frequency to hear AP2's beacon (step 118).

Timing information of neighbor candidate APs can include, for example: beacon intervals (the periodicity of occurrence of beacon frames), a targeted beacon frame transmit time, or contention-free and contention-based periods. Timing information about a neighbor candidate AP can be communicated to the STA in form of an absolute time reference (e.g., a time stamp such as, "neighbor beacon frame will occur at time xyz"), or a relative time difference to a known reference (such as indicating the number of time units difference from the frame where the timing information was sent from AP1 to the STA or from AP1's previous or current beacon frame).

Because the timing of the transmission of the next beacon frame is not known to a precision of more than a few milliseconds due to the requirement for devices to wait for the end of any on-going transmission/reception before transmitting a beacon, the AP signals to the STA an interval of time for the estimated reception (or equivalently, a target time plus an uncertainty margin).

Timing information supplied to STAs can always be supplemented by uncertainty periods, or by a specified rule allowing the STA to derive the timing information and/or the uncertainty period. Generally, the current AP would not only inform the STA that the beacon frame of the candidate AP will occur N time units earlier than the current AP's beacon frame, but would also inform the STA that, due to uncertainties, the beacon frame of the candidate AP will occur within M time units before and L time units after the indicated time or time interval. Another possibility is that the uncertainty period, instead of being specified every time the AP provides timing information, is signaled separately (through the beacon, for example) or is a specified fixed value. Both of these approaches would save signaling bandwidth.

Timing information on neighbor candidate APs can be sent to STAs using solicited and/or unsolicited broadcast/multicast-type frames (for example, included in a beacon frame), or solicited and/or unsolicited unicast-type MAC frames (for example, in Association Response frames, Reassociation Response frames, or Probe Response frames). Information elements (IEs) containing timing information can be sent in (or as part of) MAC management frames or can be piggybacked onto MAC control or data frames. Communicating timing information to STAs can also include using inter-layer service primitives (such as MAC ↔ physical layer (PHY) ↔ STA management entity (SME)) to initiate, confirm, and report on actions, including sending MAC signaling frames, measurement actions, etc.

The timing information of neighbor candidate APs can be generated in a particular AP by several methods, including: the AP uses network side signaling to retrieve timing information of neighboring APs, the AP uses its own measurements of neighbor APs, the AP uses reports from STA measurements, or the AP uses a generic timing device on the network.

In network side signaling, the APs exchange information about the transmission time of their beacons through the distribution system connecting the APs together. There are several possible implementations for network side signaling, such as: an AP broadcasts information about the timing of its beacon transmissions to all APs over the distribution system, or an AP requests beacon timing information from another AP which responds through the distribution system. Alternatively, the AP can query a network timing database, such as advantageously realized as part of a central remote or local network management entity to obtain current timing information about its neighboring APs.

When the AP uses its own measurements of neighbor APs, the measuring AP listens to the beacons of other APs and measures the transmission time of the beacons. Based on the beacon transmission interval, the measuring AP can infer approximate future transmission times. This method is useful when neighboring APs use the same frequency channel as the measuring AP. Otherwise, this method would require the measuring AP to tune to other frequency channels from time to time so that it can listen to the beacons, which is a less attractive solution.

For the AP to use reports from STA measurements, STAs report to the coordinating AP the time(s) at which they heard a beacon from neighboring AP(s) along with beacon transmission intervals, the identity of the neighboring APs, and a timestamp of the neighboring AP. The coordinating AP can use this combination of absolute and relative time references to derive the timing information. The coordinating AP stores this information in memory and infers approximate future transmission times of the beacon for these APs.

When a STA enters a BSS, it can set a flag in the Association Request frame, in the Reassociation Request frame, or in the Probe Request frame. The flag is used to indicate that the STA wants to receive a neighbor report element in the corresponding Association Response frame, Reassociation Response frame, or Probe Response frame. The flag can be implemented in various ways, for example as a simple bit flag or as an IE containing multiple values indicating the type of information the STA desires to retrieve from the AP. The neighbor report element can include a timing synchronization function (TSF) information field, which includes a TSF offset value and a beacon interval value for the neighbor AP. The TSF offset value is expressed in timing units (TUs), which are for example and without loss of generality one microsecond in length, and is the timing offset between the coordinating AP and the neighbor AP expressed in TUs relative to the coordinating AP. The beacon interval value can in one advantageous embodiment and without loss of generality be expressed as a target beacon transmission time (TBTT), which has a typical default value of 100 ms.

Timing information regarding neighbor candidate APs can be stored, accessed, or configured in an AP management information base (MIB). The MIB may be either a MAC layer MIB or a PHY layer MIB.

Figure 2:
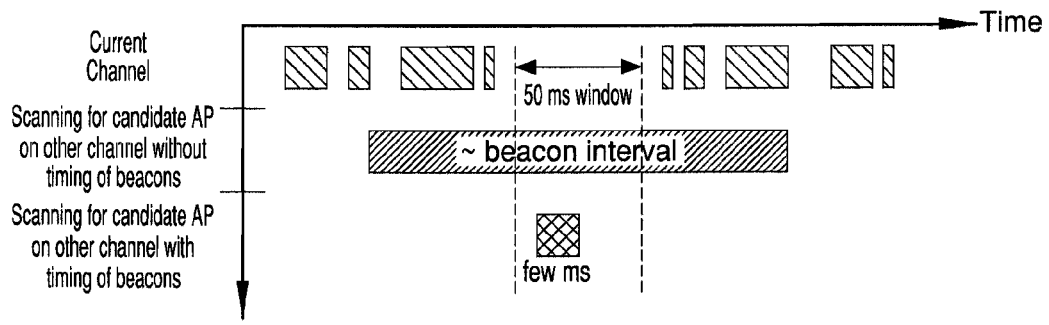
FIG. 2 is a diagram illustrating the timing for scanning one candidate AP.
Figure 3:
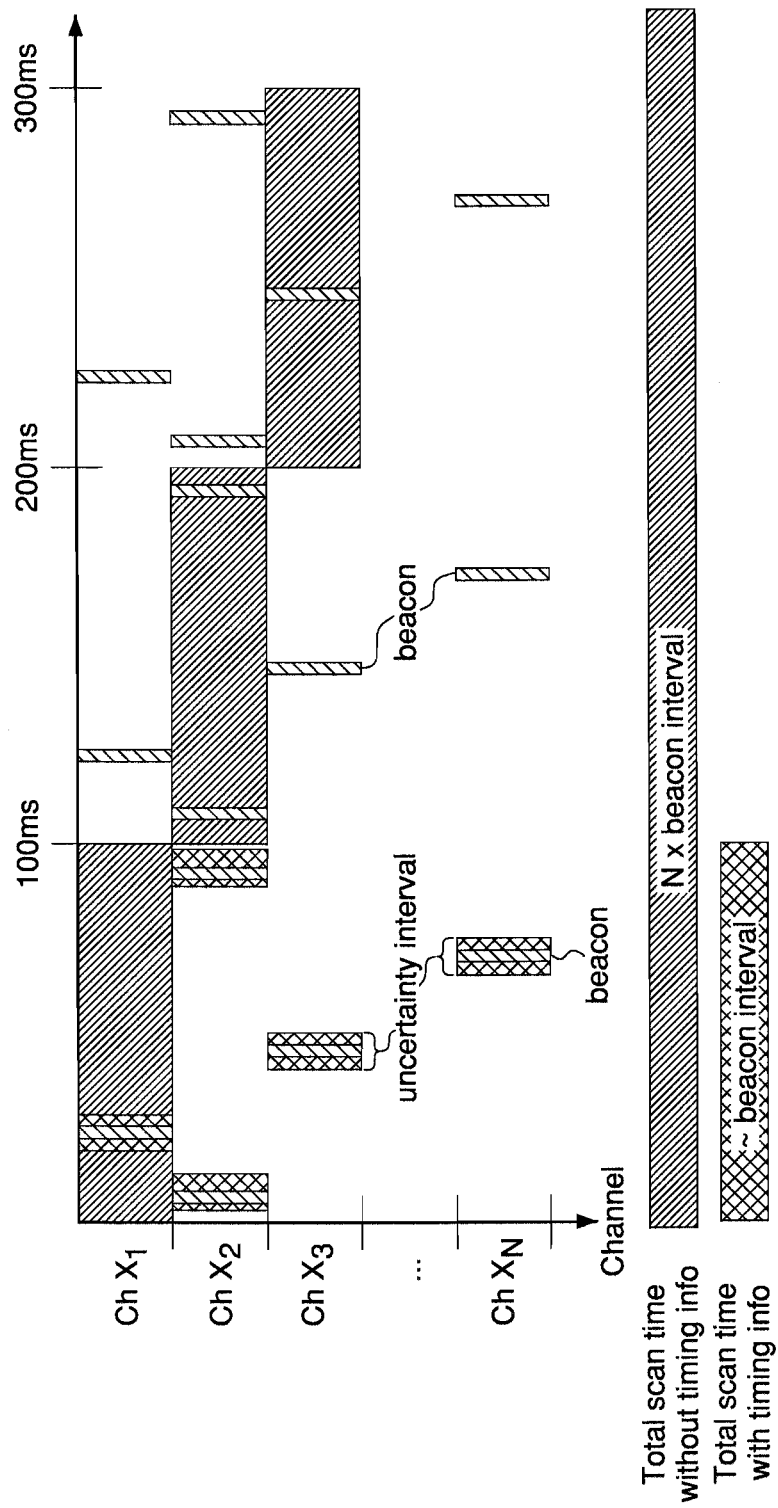
FIG. 3 is a diagram illustrating the timing for scanning N channels.

Two scenarios are shown in FIGS. 2 and 3. In FIG. 2, when the STA knows the approximate time of arrival of the beacon frame for the neighbor candidate AP, the scanning time during which a STA needs to dwell on a given frequency to hear a particular AP is typically around several milliseconds if the timing information is known, down from one full beacon interval (typically 100 ms), if the timing information is not known.

In FIG. 3, the gain of the proposed method when scanning several APs on different frequencies is illustrated. Typically, when using timing information, the STA can establish a schedule based on the occurrence of the beacon frames and measure all of them in a single or few number of beacon intervals, whereas it would require several beacon intervals if timing information was not used. The "uncertainty interval" shown in FIG. 3 refers to the uncertainty regarding the exact time of transmission of the beacon due to the need to defer to other transmissions.

The methods described above are applicable to IEEE 802.11-based WLANs, and in particular to WLANs based on: 802.11r (Fast BSS Transmission), 802.11s (Extended Service Set (ESS) Mesh), 802.11k Radio Resource Measurement, and 802.11n (High-Throughput WLAN). The methods are also applicable to other wireless network types.

Figure 4:
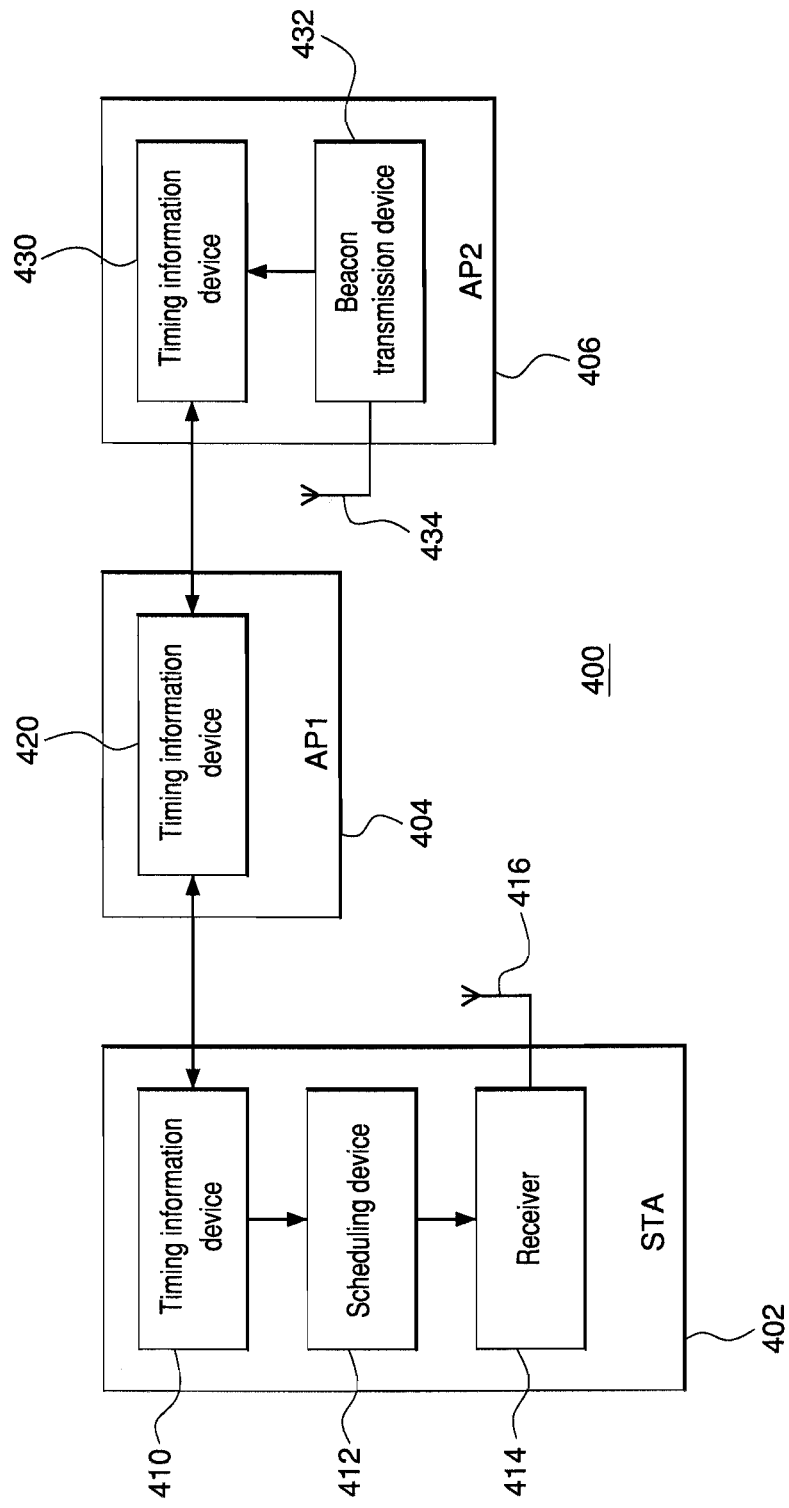
FIG. 4 is a diagram of a system for communicating timing information between a STA, an AP to which the STA is associated, and a candidate AP.

FIG. 4 is a diagram of a system 400 for communicating timing information between a STA 402, an AP (AP1) 404 to which the STA 402 is associated, and a candidate AP (AP2) 406. The system 400 can be used when timing information is passed from AP2 to AP1 via the distribution network. The STA 402 includes a timing information device 410, a scheduling device 412, a receiver 414, and an antenna 416. AP1 404 includes a timing information device 420. AP2 includes a timing information device 430, a beacon transmission device 432, and an antenna 434.

The system 400 operates as follows. As an optional step, STA 402 requests timing information about AP2 406 by sending a request from timing information device 410 to the timing information device 420 at AP1 404. AP1 404 receives the timing information regarding AP2 406 through timing information device 420 and timing information device 430, respectively. As described above in connection with FIG. 1, AP1 404 can receive the timing information regarding AP2 406 in a variety of ways.

In AP2 406, the beacon transmission device 432 transmits its beacon via antenna 434 and communicates the timing information for transmitting the beacon to the timing information device 430. The timing information is sent from the timing information device 430 to the timing information device 420 in AP1 404. AP1 404 sends the timing information for AP2 406 from the timing information device 420 to the timing information device 410 in the STA 402.

Once the STA 402 receives the timing information for AP2 406, the timing information is passed from the timing information device 410 to the scheduling device 412. The scheduling device 412 determines when the STA 402 will adjust its receiver 414 to scan and receive the beacon transmission from AP2 406.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. An access point, comprising:
   a receiver configured to receive an information request from a station associated with the access point, wherein the information request is requesting information about a second beacon transmission associated with a service set identifier (SSID) different from an SSID of the access point;
   a timing information device configured to generate an information response for a beacon signal associated with the SSID different from the SSID of the access point, wherein the information response includes a time difference, relative to a beacon signal sent by the access point, for transmission of the beacon signal associated with the SSID different from the SSID of the access point, and the time difference is an offset in timing units; and
   a transmitter configured to transmit the information response to the station in response to receiving the information request.

2. The access point of claim 1, wherein the information request is a probe request, an association request, or a reassociation request.

3. The access point of claim 1, wherein the timing information device is further configured to receive data associated with the SSID different from the SSID of the access point via network side signaling.

4. The access point of claim 1, wherein the transmitter is configured to transmit the information response to the station in a beacon frame, a probe response frame, an association response frame, or a reassociation response frame.

5. The access point of claim 1, wherein the timing information device is further configured to request the time difference from a second access point associated with the SSID different from the SSID of the access point.

6. The access point of claim 1, wherein the timing information device is further configured to request beacon measurements from stations associated with the access point to enable the timing information device to determine the time difference.

7. An access point having a first service set identifier (SSID), comprising:
   a beacon transmission device configured to transmit a beacon signal including the first SSID;
   a timing information device, configured to:
     receive a timing information request from a second access point associated with a second SSID in response to the second access point associated with the second SSID receiving a timing information request from a station; and generate timing information about the beacon signal including the first SSID, to enable the second access point associated with the second SSID to determine a time difference relative to a known reference time for transmission of the beacon signal including the first SSID, and the time difference is an offset in timing units; and a transmitter configured to report the timing information to the second access point associated with the second SSID to enable the second access point associated with the second SSID to report the timing information to the station.

8. The access point of claim 7, wherein the timing information device is configured to report the timing information to the second access point associated with the second SSID via network side signaling.

9. A method for use in an access point, the method comprising:

receiving an information request from a station associated with the access point, wherein the information request is requesting information about a second beacon transmission associated with a service set identifier (SSID) different from an SSID of the access point;

generating an information response for a beacon signal sent associated with the SSID different from the SSID of the access point, wherein the information response includes a time difference, relative to a beacon signal sent by the access point, for transmission of the beacon signal associated with the SSID different from the SSID of the access point, and the time difference is an offset in timing units; and transmitting the information response to the station in response to receiving the information request.

10. The method of claim 9, wherein the information request is a probe request, an association request, or a reassociation request.

11. The method of claim 9, wherein the information is received from a second AP associated with the SSID different from the SSID of the access point by network side signaling.

12. The method of claim 9, wherein the information response is transmitted to the station in a beacon frame, a probe response frame, an association response frame, or a reassociation response frame.

13. The method of claim 9, further comprising:
requesting the time difference from a second AP associated with the SSID different from the SSID of the access point.

14. The method of claim 9, further comprising:
requesting beacon measurements from stations associated with the access point to enable determination of the time difference.

15. A method for use in an access point having a first service set identifier (SSID), the method comprising:

transmitting a beacon signal including the first SSID;

receiving a timing information request from a second access point associated with a second SSID in response to the second access point associated with the second SSID receiving a timing information request from a station;

generating timing information about the beacon signal including the first SSID, to enable the second access point associated with the second SSID to determine a time difference relative to a known reference time for transmission of the beacon signal including the first SSID, and the time difference is an offset in timing units; and transmitting the timing information to the second access point associated with the second SSID to enable the second access point associated with the second SSID to report the timing information to the station.

16. The method of claim 15, wherein the transmitting the timing information to the second access point associated with the second SSID occurs via network side signaling.

* * * * *